United States Patent
Hudman

(10) Patent No.: US 11,320,692 B2
(45) Date of Patent: May 3, 2022

(54) SPATIALLY VARYING POLARIZER FOR DISPLAY BACKLIGHT

(71) Applicant: Valve Corporation, Bellevue, WA (US)

(72) Inventor: Joshua Mark Hudman, Issaquah, WA (US)

(73) Assignee: Valve Corporation, Bellevue, WA (US)

( * ) Notice: Subject to any disclaimer, the term of this patent is extended or adjusted under 35 U.S.C. 154(b) by 0 days.

(21) Appl. No.: 17/164,284

(22) Filed: Feb. 1, 2021

(65) Prior Publication Data

US 2021/0240038 A1    Aug. 5, 2021

Related U.S. Application Data

(60) Provisional application No. 62/969,476, filed on Feb. 3, 2020.

(51) Int. Cl.
  *G02F 1/1335*   (2006.01)
  *G02F 1/13363*  (2006.01)
  *F21V 8/00*     (2006.01)

(52) U.S. Cl.
  CPC ..... *G02F 1/133538* (2021.01); *G02B 6/0041* (2013.01); *G02B 6/0058* (2013.01); *G02F 1/133536* (2013.01); *G02F 1/133636* (2013.01)

(58) Field of Classification Search
  CPC ......... G02F 1/133538; G02F 1/133536; G02F 1/133636; G02F 1/133631; G02F 1/133615; G02B 6/0041; G02B 6/0058
  See application file for complete search history.

(56) References Cited

U.S. PATENT DOCUMENTS

| | | | |
|---|---|---|---|
| 6,982,773 B2 | 1/2006 | Kurtz et al. | |
| 7,160,017 B2 | 1/2007 | Lee et al. | |
| 7,295,312 B1 | 11/2007 | Gerhart et al. | |
| 8,004,675 B2 | 8/2011 | Lefaudeux | |
| 8,235,533 B2 | 8/2012 | Hudman et al. | |
| 8,368,889 B2 | 2/2013 | Schwiegerling et al. | |
| 8,982,313 B2 | 3/2015 | Escuti et al. | |
| 9,298,041 B2 | 3/2016 | Escuti et al. | |
| 9,335,586 B2 | 5/2016 | Escuti et al. | |
| 9,410,677 B2 | 8/2016 | Wheatley et al. | |
| 10,203,489 B2 | 2/2019 | Khan et al. | |

(Continued)

OTHER PUBLICATIONS

International Search Report and Written Opinion, dated Apr. 14, 2021, for International Application No. PCT/US 21/16039, 11 pages.

(Continued)

*Primary Examiner* — Donald L Raleigh
(74) *Attorney, Agent, or Firm* — Seed Intellectual Property Law Group LLP

(57) ABSTRACT

Systems and methods for providing a display for an electronic device that includes a liquid crystal display panel assembly, a backlight assembly that includes a light source, and a spatially varying polarizer that provides phase retardation that varies as a function of propagation length away from the light source. The display may also include a linear polarizer and other optical components that improve the efficiency of the backlight assembly, thereby reducing power consumption, cost, space requirements, and provide other advantages.

20 Claims, 4 Drawing Sheets

(56) References Cited

U.S. PATENT DOCUMENTS

| | | | |
|---|---|---|---|
| 2008/0226844 A1 | 9/2008 | Shemo et al. | |
| 2011/0032483 A1* | 2/2011 | Hruska | G03B 35/26 |
| | | | 353/8 |
| 2011/0310220 A1 | 12/2011 | McEldowney | |
| 2012/0092668 A1 | 4/2012 | Du et al. | |
| 2013/0176704 A1 | 7/2013 | Lanman et al. | |
| 2013/0286479 A1 | 10/2013 | Sung et al. | |
| 2015/0131311 A1 | 5/2015 | Wheatley et al. | |
| 2015/0301261 A1 | 10/2015 | Nevitt et al. | |
| 2016/0182889 A1 | 6/2016 | Olmstead | |
| 2016/0349516 A1 | 12/2016 | Alexander et al. | |
| 2019/0243147 A1 | 8/2019 | Smithwick et al. | |
| 2019/0377183 A1 | 12/2019 | Sharp | |
| 2020/0301147 A1 | 9/2020 | Klug | |

OTHER PUBLICATIONS

Hornburg et al., "Multiband retardation control using multi-twist retarders," Proc. of SPIE, Polarization: Measurement, Analysis, and Remote Sensing XI, vol. 9099, 90990Z, 2014, 9 pages.

Hornburg et al., "Wide color gamut multi-twist retarders," Proc. of SPIE, Emerging Liquid Crystal Technologies X, vol. 9384, 93840W, 2015, 11 pages.

ImagineOptix, "Consumer Electronics Optics," Augmented and Virtual Reality Optics Technology in Consumer Electronics—ImagineOptix, retrieved from <https://www.imaginoptix.com/applications/consumer-electronics/>, on Dec. 17, 2019, 3 pages.

Komanduri et al., "Multi-twist retarders for broadband polarization transformation," Proc. of SPIE, Emerging Liquid Crystal Technologies VII, vol. 8279, 82790E, 2012, 10 pages.

Komanduri et al., "Multi-twist retarders: broadband retardation control using self-aligning reactive liquid crystal layers," Optics Express, Optical Society of America, vol. 21, No. 1 Jan. 14, 2013, 17 pages.

Perreault, "Triple Wollaston-prism complete-Stokes imaging polarimeter," Optics Letters, Optical Society of America, vol. 38, No. 19, Oct. 1, 2013, 4 pages.

\* cited by examiner

SPATIALLY VARYING POLARIZER FOR DISPLAY BACKLIGHT

BACKGROUND

Technical Field

The present disclosure generally relates to display systems, and more particularly to backlights for display systems.

Description of the Related Art

Demand for displays with heightened performance is increasing, including with the growth of smart phones, tablets, wearable devices, high-definition televisions, as well as other electronic devices. The growing popularity of virtual reality and augmented reality systems, particularly those using head mounted displays, has further increased such demand. Virtual reality systems typically envelop a wearer's eyes completely and substitute a "virtual" reality for the actual view (or actual reality) in front of the wearer, while augmented reality systems typically provide a semi-transparent or transparent overlay of one or more screens in front of a wearer's eyes such that actual view is augmented with additional information. In many virtual reality and augmented reality systems, the movement of a wearer of such a head mounted display may be tracked in various manners, such as via sensors in the head mounted display and/or external to it, in order to enable the images being shown to reflect user movements.

Increasingly, there is a demand for displays that have improved performance while also being smaller or larger in size, consuming less power, and generating less heat relative to what is currently available. Accordingly, needs exist for improved display panels, and for improved techniques for manufacturing and using display panels.

BRIEF SUMMARY

A display may be summarized as including a non-emissive display panel assembly; a backlight assembly including a light source; and a spatially varying polarizer positioned between the non-emissive display panel assembly and the backlight assembly, the spatially varying polarizer having a polarization that spatially varies as a function of propagation length away from the light source. The spatially varying polarizer may include a multi-twist retarder. The spatially varying polarizer may provide no retardation at a proximal end near the light source and quarter-wavelength retardation at a distal end opposite the proximal end. The retardation of the spatially varying polarizer may vary linearly or non-linearly between a proximal end near the light source and a distal end opposite the proximal end.

The display may further include a linear polarizer positioned between the spatially varying polarizer and the non-emissive display panel assembly. The linear polarizer may include dual brightness enhancement film (DBEF).

The display may further include control circuitry operatively coupled to the spatially varying polarizer, the control circuitry operative to selectively adjust the retardation provided by the spatially varying polarizer. The backlight assembly may include a light guide plate that includes light-scattering features. The backlight assembly may include a light guide plate that does not include any light-scattering features. The backlight assembly may include a wedge-shaped light guide plate. The non-emissive display panel assembly may include a liquid crystal display panel assembly. The light source may include an array of light emitting diodes.

A display may be summarized as including a non-emissive display panel assembly; a backlight assembly including a light guide plate and a light source that provides light to an edge of the light guide plate; a reflective polarizer positioned between the non-emissive display panel assembly and the light guide plate; and a spatially varying polarizer positioned between the reflective polarizer and the light guide plate, the spatially varying polarizer having a polarization that spatially varies as a function of propagation length away from the light source. The spatially varying polarizer may include a multi-twist retarder. The reflective polarizer may include a dual brightness enhancement film (DBEF). The spatially varying polarizer may provide no retardation at a proximal end near the light source and quarter-wavelength retardation at a distal end opposite the proximal end. The light guide plate may include light-scattering features. The light guide plate may not include any light-scattering features. The light source may include an array of light emitting diodes. The display may be a display of a head-mounted display device, a television, a laptop computer, a smartphone, a tablet computer, a computer monitor, or a wearable electronic device.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
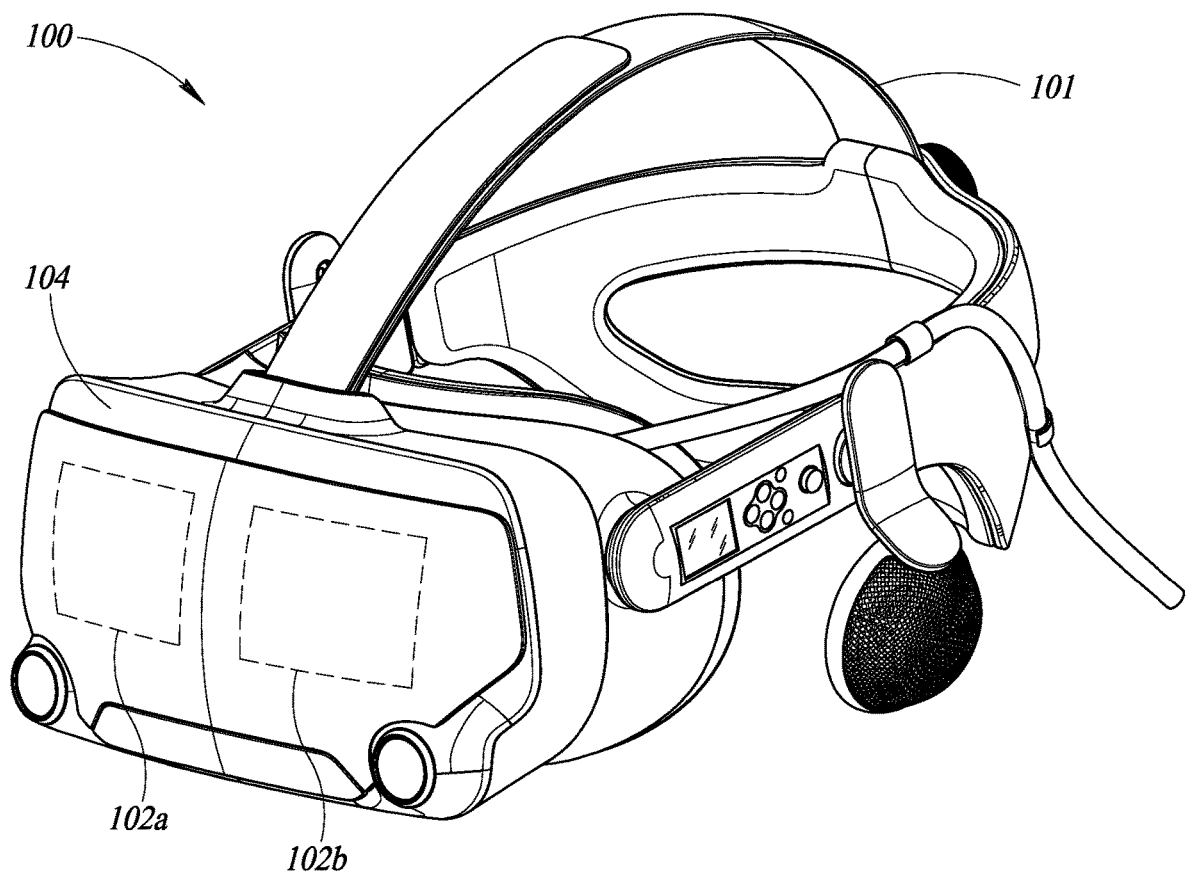
FIG. 1 is an example of a head-mounted display device that includes dual display panels, according to one illustrated implementation.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure are directed to displays for electronic devices, such as head-mounted display devices, laptop computers, tablet computers, televisions, smartphones, wearable computers, computer monitors, etc. Non-limiting examples of electronic devices that may include such displays are shown in FIGS. 1-3.

Liquid crystal displays (LCDs) are a common example of non-emissive displays that require an independent light source, referred to as a backlight unit or assembly. Backlight assemblies provide such displays with homogeneous and bright light with appropriate color characteristics. Backlight technology has become more important recently due to the advent of edge-lit light emitting diode (LED) backlights which have allowed displays to be made much slimmer than previous displays while also reducing power consumption. To meet energy regulations or to satisfy other requirements, it is important for backlight assemblies to be as efficient as possible. As discussed further below, the present disclosure improves the performance of backlight assemblies by providing a spatially varying polarizer that provides phase retardation that varies as a function of propagation length away from the light source of the backlight assembly.

FIG. 1 illustrates a non-limiting example of an electronic device in the form of an head-mounted display device 100, which may be coupled to a video rendering computing system via a wired or wireless connection to provide a virtual reality display to a human user. In operation, the user wears the HMD device 100 on their head, secured via one or more straps 101, and receives displayed information at each eye via displays 102a and 102b supported by a support structure 104 of the HMD device from the computing system of a simulated environment different from the actual physical environment, with the computing system acting as an image rendering system that supplies images of the simulated environment to the HMD device for display to the user, such as images generated by a game program (not shown) and/or other software program (not shown) executing on the computing system. The user is further able to move around the actual physical environment in this example, and may further have one or more I/O ("input/output") devices to allow the user to further interact with the simulated environment, such as hand-held controllers that are communicatively coupled to the computing system via wired or wireless connections. As the user moves location and/or changes orientation of the HMD device 100, the position of the HMD device may be tracked, such as to allow a corresponding portion of the simulated environment to be displayed to the user on the HMD device, and the controllers may further employ similar techniques to use in tracking the positions of the controllers (and to optionally use that information to assist in determining and/or verifying the position of the HMD device). After the tracked position of the HMD device 100 is known, corresponding information is transmitted to the computing system, which uses the tracked position information to generate one or more next images of the simulated environment to display to the user via the displays 102a and 102b.

Figure 2:
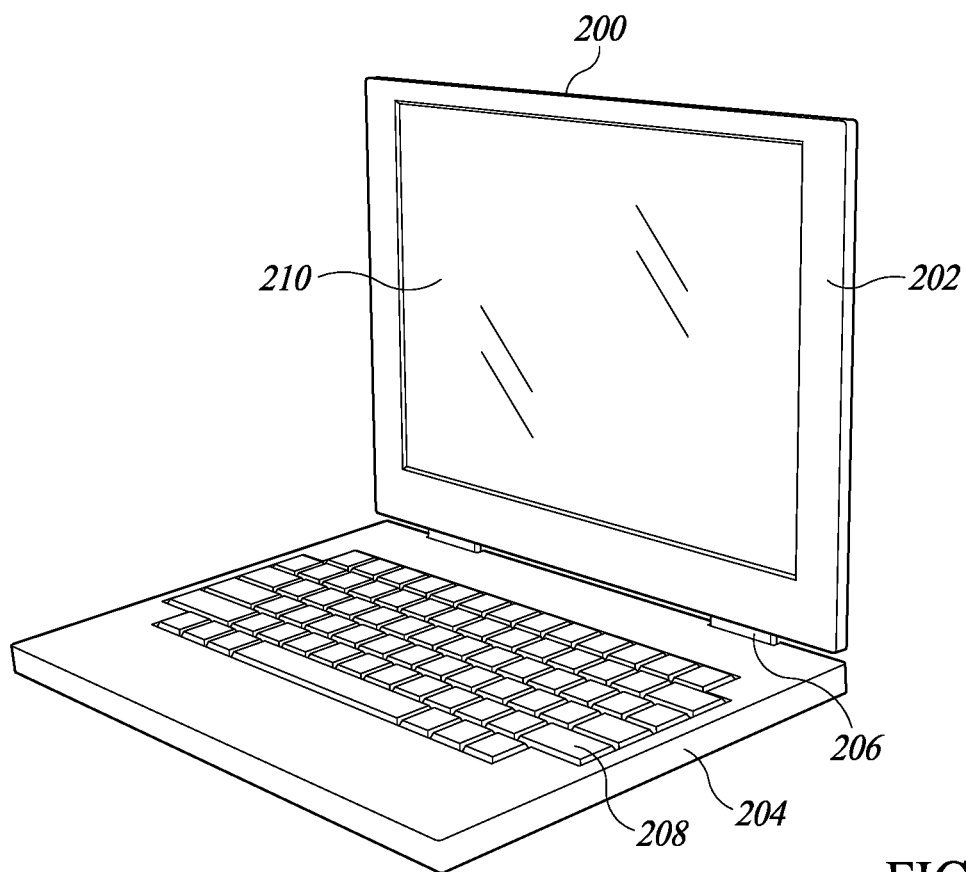
FIG. 2 is an example of a laptop that includes a display panel, according to one illustrated implementation.
Figure 3:
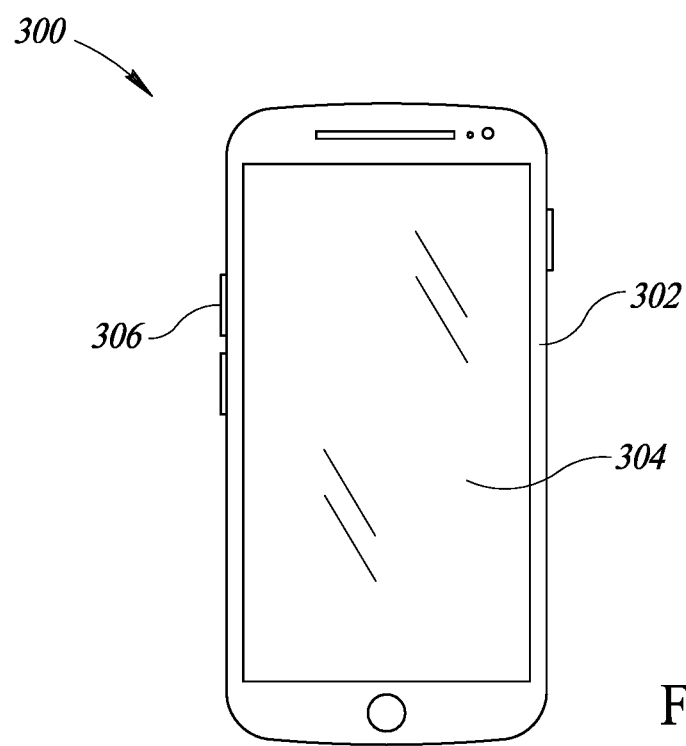
FIG. 3 is an example of a smartphone that includes a display panel, according to one non-limiting illustrated implementation.

FIG. 2 shows an example electronic device in the form of a laptop computer 200 having an upper housing 202 and a lower housing 204 coupled together via hinges 206 that allow the housings to rotate relative to each other. The lower housing 204 includes a keyboard 208 and may include other structures (e.g., touchpad, various ports). The upper housing 202 includes a display panel 210 that may be used to display content to the user.

FIG. 3 shows an example electronic device in the form of a smartphone 300. The smartphone 300 includes a housing 302 that includes a display panel 304 and a plurality of input components 306 (e.g., buttons). In at least some implementations the display panel 304 may be a touchscreen display, for example.

More generally, the displays of the present disclosure may be implemented in any type of electronic device, such as the devices shown in FIGS. 1-3, or other devices including music players, gaming devices, navigation units, vehicle displays, wearable devices, kiosks, or other types of devices that include one or more displays.

Figure 4:
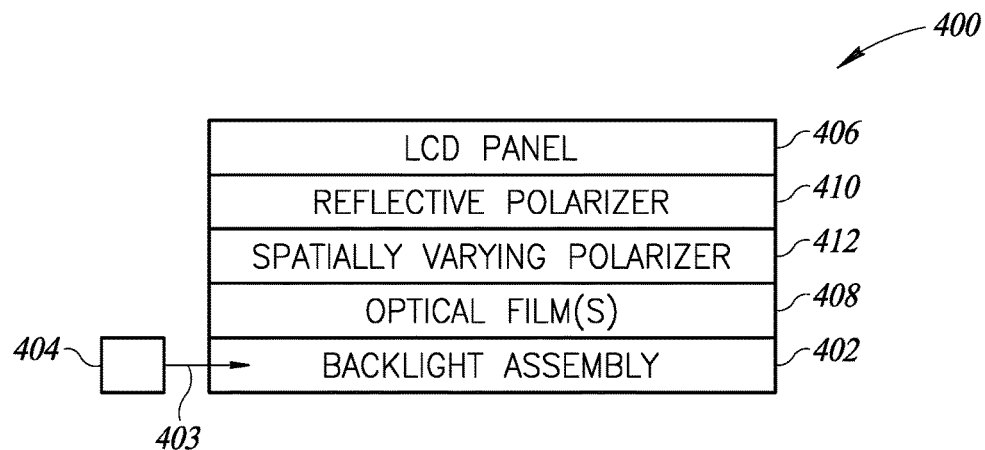
FIG. 4 is a sectional view of a display panel that includes a backlight assembly with a spatially varying polarizer, according to one non-limiting illustrated implementation.

FIG. 4 shows a sectional side view of an example liquid crystal display (LCD) 400 according to one or more embodiments of the present disclosure. The display 400 may be implemented any type of electronic device, such as the devices 100, 200, and 300 of FIGS. 1, 2, and 3, respectively.

The display 400 includes a number of stacked layers that may each be generally similar in shape (e.g., rectangular). The display 400 may include a backlight assembly 402 that receives light 403 from a light source 404 positioned substantially adjacent an edge of the backlight assembly 402. The display 400 also includes a display module that includes an LCD panel 406 or other display layers (e.g., any non-emissive display assembly layers), other light processing layers such as optical film(s) 408, and a linear or reflective polarizer 410 (e.g., dual brightness enhancement film (DBEF)).

The display 400 also includes light retardation layer in the form of a spatially varying polarizer (SVP) 412 that varies the phase retardation of light as a function of propagation length (from left to right as shown in FIG. 4). As discussed further below, the spatially varying polarizer 412 functions to increase the efficiency and uniformity of the light source 404 by increasing the amount of light that is passed upward (as shown) to the LCD panel 406.

When present, the optical film(s) 408 may be formed as a portion of the backlight assembly 402 or may be formed separately therefrom. The spatially varying polarizer 412 may be positioned above the optical film 408 and below the reflective polarizer 410, as shown. In other implementations, the display 400 may include the spatially varying polarizer 412 but may not include a separate linear polarizer 410. It should be appreciated that the configuration shown in FIG. 4 is merely illustrative and other configurations are contemplated which may include the same layers arranged differently, fewer or more layers, or different layers. As non-limiting examples, the spatially varying polarizer 412 may be positioned between one or more optical films 408, between the optical films and the backlight assembly 402, within the backlight assembly 402, etc.

Figure 5:
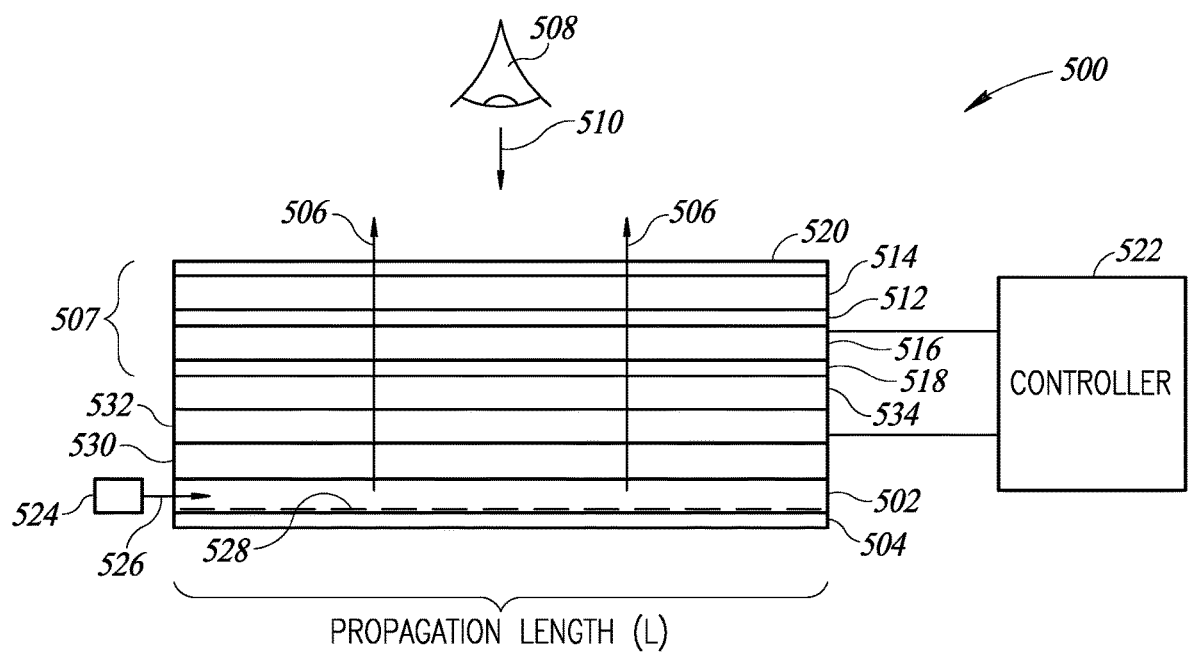
FIG. 5 is a detailed sectional view of a display panel, according to one non-limiting illustrated implementation.

FIG. 5 shows a more detailed sectional view of an example display 500 that may implement the features of the present disclosure. The display 500 may be implemented any type of electronic device, such as the devices 100, 200, and 300 of FIGS. 1, 2, and 3, respectively, and may be similar or identical to the display 400 of FIG. 4.

The display 500 includes a backlight assembly that includes a light guide prism or plate (LGP) 502 and a reflector 504 that may be used for generating backlight 506. In operation, backlight 506 travels outward (upward as shown) and passes through display pixel structures in display layers 507, which illuminates images that are produced by the display pixels for viewing by a user 508 in the direction 510. The display layers 507 may be positioned in a plastic or metal structure to form a display module that is mounted in a housing of an electronic device. The display layers 507 may form a liquid crystal display panel or may be used to form other types of displays.

In the illustrated example, the display layers 507 include a liquid crystal layer 512 that is positioned between display layers 514 and 516, which may be positioned between a lower polarizer layer 518 and an upper polarizer layer 520. The layers 514 and 516 may be formed from transparent substrate layers such as clear layers of plastic or glass. The layers 514 and 516 may comprise a color filter layer or a thin-film transistor layer, for example. Color filter elements, transistors, conductive traces, or other structures may be formed on the substrate of the layers 514 and 516 to form a color filter layer and/or a thin-film transistor layer. In at least some implementations, the layers 514 or 516, or other layers, may include touch sensor electrodes that are used to implement touchscreen functionality for the display 500. As a non-limiting example, the layer 516 may comprise a thin-film transistor layer that includes an array of transistors and display pixel electrodes that are operative to apply electric fields to the liquid crystal layer 512. In this example, the layer 514 may be a color filter layer that includes an array of color filter elements that function to provide the display 500 with the ability to display color images. In other implementations, the layer 514 may be a thin-film transistor layer and the layer 516 may be a color filter layer.

During operation of the display 500, control circuitry 522 operatively coupled to the layer 516, which in this example comprises a thin-film transistor layer, may be used to generate information to be displayed on the display. The control circuitry 522 may include various circuitry and components, such as a display driver circuit, a flexible circuit board, various conductive traces and couplings, etc., to drive the transistors of the layer 516.

The backlight assembly may include the light guide prism or plate 502, which may be formed from a transparent material such as glass or plastic. The light guide prism 502 may be rectangular in shape or may have a wedge shape that is thicker toward a light source 524 and is tapered to be narrower in the direction away from the light source. During operation, a light source 524 generates light 526 that is directed into an edge of the light guide prism 502. The light source 524 may be any suitable light source, such as an array of light emitting diodes (LEDs) positioned along the edge of the light guide prism to couple light into the light guide prism.

The light 526 emitted from the light source 524 may be coupled into the edge surface of the light guide prism 502 and may be distributed throughout the prism via total internal reflection. In at least some implementations, the light guide prism 502 may include light-scattering features 528, which may be referred to as dots, pits or bumps, for example. The light-scattering features 528 may be located on an upper surface or on a lower surface of the light guide prism 502.

In other implementations, the light guide prism 502 may not include any light-scattering features 528, which may allow for more efficient use of the light source 524 since the light-scattering features reduce efficiency and cause the loss of polarization control. In such implementations, the light 526 may be provided to the light guide prism 502 at a relatively wide angle (e.g., ±40°, ±20°), and the spatially varying polarizer 532 may be tuned to provide a uniform backlight across the length of the display 500, as discussed further below.

The light 526 that scatters upward (as shown) from the light guide prism 502 may serve as backlight 506 for the display 500. Light 526 that scatters downwards may be reflected back in the upward direction by the reflector 504, which may be formed from any suitable reflective material such as white plastic or other reflective materials.

To improve the performance of the backlight assembly, implementations of the present disclosure include one or more of optical film(s) 530, a spatially varying polarizer 532, or a reflective polarizer 534 (e.g., DBEF).

The optical film layer 530 may include one or more diffuser layers (e.g., diffuser films) that reduce hotspots, compensation films for enhancing off-axis viewing, or other types of films (e.g., prism films for collimating the backlight 506).

The spatially varying polarizer 532 may be positioned between the reflective polarizer 534 and the optical film(s) 530. More generally, the spatially varying polarizer 532 may be positioned anywhere between the reflective polarizer 534 and the light guide prism 502.

In at least some implementations, the display 500 includes the spatially varying polarizer 532 and does not include a linear reflective polarizer 534. In such implementations, the spatially varying polarizer 532 may be tuned to selectively allow light to travel therethrough in a way that the light is uniformly transmitted without significant loss. For example, the spatially varying polarizer may provide linear polarization at a proximal end that gradually varies the retardation to provide circular polarization (e.g., $\lambda/4$ retardation) at the distal end.

The spatially varying polarizer 532 may comprise a wave retarder that is formed of birefringent materials. Birefringence is the property of a material that has a refractive index that depends on the polarization and propagation direction of light. The wave retarder alters the polarization state or phase of light traveling through the wave retarder. The wave retarder may have a slow axis (or extraordinary axis) and a fast axis (ordinary axis). As polarized light travels through the wave retarder, the light along the fast axis travels more quickly than along the slow axis.

Figure 6:
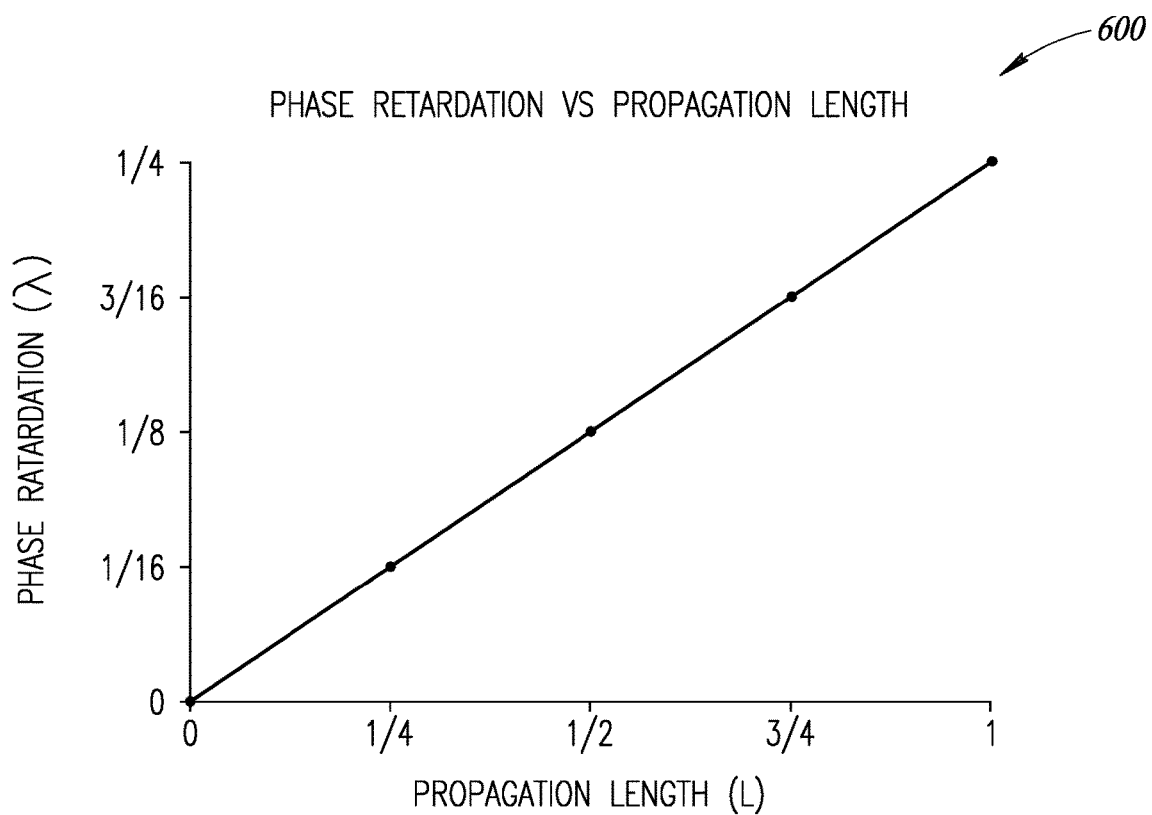
FIG. 6 is a graph that shows an example of phase retardation for a spatially varying polarizer that varies as a function of propagation length away from a light source, according to one non-limiting illustrated implementation.
Figure 7:
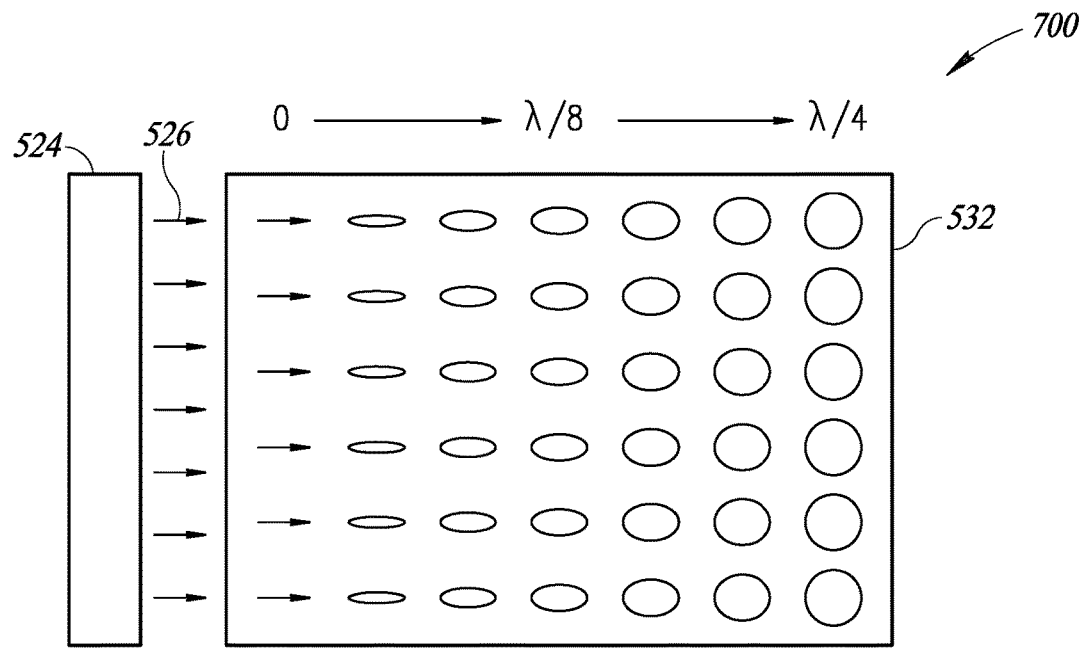
FIG. 7 is a plan view of the spatially varying polarizer, showing that the phase retardation for the spatially varying polarizer varies as a function of propagation length away from a light source from no retardation (linear) at an edge proximate the light source to quarter-wave retardation (circular) at an edge distal to the light source, according to one non-limiting illustrated implementation.

As discussed above, the spatially varying polarizer 532 may provide phase retardation that varies a function of propagation length (L) from the light source 524, e.g., from left to right as shown in FIG. 5, which allows for more uniform and efficient distribution of the light from the light guide prism 502 to the display layers 507. FIG. 6 is a graph 600 that shows a non-limiting example of phase retardation as a function of propagation length for a spatially varying polarizer of the present disclosure, such as the spatially varying polarizers 412 and 532 of FIGS. 4 and 5, respectively. In this example, the spatially varying polarizer provides no retardation at a proximal end near the light source (e.g., light source 524), and linearly increases the retardation to provide a retardation of $\lambda/4$ at the distal end of the spatially varying polarizer furthest away from the light source. Specifically, in the illustrated example, the retardation of the spatially varying polarizer is $0\lambda$ at $0$ L, $(\frac{1}{16})\lambda$ at $(\frac{1}{4})$L, $(\frac{1}{8})\lambda$, at $(\frac{1}{2})$L, $(\frac{3}{16})\lambda$ at $(\frac{3}{4})$ L, and $(\frac{1}{4})\lambda$ at L. FIG. 7 shows a top plan view 700 of the spatially varying polarizer 532, showing that the phase retardation for the spatially varying polarizer varies as a function of propagation length away from the light source 524 from no retardation (linear) at the left edge (as shown) proximate the light source, to quarter-wave retardation (circular) at the right edge distal from the light source.

Although the illustrated example shows a spatially varying polarizer with a linearly increasing retardation that varies between 0 and $\lambda/4$, it should be appreciated that numerous other configurations may be provided. Generally, the spatially varying polarizer may provide retardation that varies in any way as a function of propagation length away from the light source, and the amounts of retardation may be any value (e.g., $\lambda/20$, $\lambda/10$, $\lambda/4$, $\lambda$, $2\lambda$). Further, the amount of retardation may increase only, decrease only, or both increase and decrease. The amount of retardation may vary continuously, or may vary in a number of steps. The amount of retardation may vary according to any type of function including, for example, linear functions, polynomial functions, exponential functions, step functions, other types of functions, or combinations thereof.

In at least some implementations, the spatially varying polarizer may be formed of a multi-twist retarder (MTR), which is a waveplate-like retardation film that provides precise and customized levels of broadband, narrowband or multiple band retardation in a single thin film. More specifically, MTR comprises two or more twisted liquid crystal (LC) layers on a single substrate and with a single alignment layer. Subsequent LC layers are aligned directly by prior layers, allowing simple fabrication, achieving automatic layer registration, and resulting in a monolithic film with a continuously varying optic axis.

Referring back to FIG. 5, in at least some implementations, the control circuitry 522 may be operatively coupled to the spatially varying polarizer 532 to selectively vary the spatially-dependent phase retardation of the spatially varying polarizer to any desired configuration. In such implementations, the display 500 may include additional layers, such as one or more additional thin-film transistor layers, that allow the spatially-dependent phase retardation of the spatially varying polarizer 532 to be selectively controlled. The control circuitry 522 may control the phase retardation at any desired rate, such as one time only, periodically, at a rate that is equal to a frame rate of the display 500 or a fraction thereof, etc.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A display, comprising:
   a non-emissive display panel assembly;
   a backlight assembly comprising a light source; and
   a spatially varying polarizer positioned between the non-emissive display panel assembly and the backlight assembly, the spatially varying polarizer having a polarization that spatially varies as a function of propagation length away from the light source.

2. The display of claim 1 wherein the spatially varying polarizer comprises a multi-twist retarder.

3. The display of claim 1 wherein the spatially varying polarizer provides no retardation at a proximal end near the light source and provides quarter-wavelength retardation at a distal end opposite the proximal end.

4. The display of claim 1 wherein the retardation of the spatially varying polarizer varies linearly or non-linearly between a proximal end near the light source and a distal end opposite the proximal end.

5. The display of claim 1, further comprising:

a linear polarizer positioned between the spatially varying polarizer and the non-emissive display panel assembly.

6. The display of claim 5 wherein the linear polarizer comprises dual brightness enhancement film (DBEF).

7. The display of claim 1, further comprising:

control circuitry operatively coupled to the spatially varying polarizer, the control circuitry operative to selectively adjust the retardation provided by the spatially varying polarizer.

8. The display of claim 1 wherein the backlight assembly comprises a light guide plate that includes light-scattering features.

9. The display of claim 1 wherein the backlight assembly comprises a light guide plate that does not include any light-scattering features.

10. The display of claim 1 wherein the backlight assembly comprises a wedge-shaped light guide plate.

11. The display of claim 1 wherein the non-emissive display panel assembly comprises a liquid crystal display panel assembly.

12. The display of claim 1 wherein the light source comprises an array of light emitting diodes.

13. A display, comprising:

a non-emissive display panel assembly;

a backlight assembly comprising a light guide plate and a light source that provides light to an edge of the light guide plate;

a reflective polarizer positioned between the non-emissive display panel assembly and the light guide plate; and a spatially varying polarizer positioned between the reflective polarizer and the light guide plate, the spatially varying polarizer having a polarization that spatially varies as a function of propagation length away from the light source.

14. The display of claim 13 wherein the spatially varying polarizer comprises a multi-twist retarder.

15. The display of claim 13 wherein the reflective polarizer comprises a dual brightness enhancement film (DBEF).

16. The display of claim 13 wherein the spatially varying polarizer provides no retardation at a proximal end near the light source and provides quarter-wavelength retardation at a distal end opposite the proximal end.

17. The display of claim 13 wherein the light guide plate includes light-scattering features.

18. The display of claim 13 wherein the light guide plate does not include any light-scattering features.

19. The display of claim 13 wherein the light source comprises an array of light emitting diodes.

20. The display of claim 13, wherein the display is a display of a head-mounted display device, a television, a laptop computer, a smartphone, a tablet computer, a computer monitor, or a wearable electronic device.

* * * * *